United States Patent [19]

Loucks et al.

[11] Patent Number: 5,261,768
[45] Date of Patent: Nov. 16, 1993

[54] AUTOMATED EDGE FINISHING USING AN ACTIVE XY TABLE

[75] Inventors: Clifford S. Loucks, Cedar Crest; Gregory P. Starr, Albuquerque, both of N. Mex.

[73] Assignee: Sandia National Laboratories, Albuquerque, N. Mex.

[21] Appl. No.: 949,206

[22] Filed: Sep. 23, 1992

[51] Int. Cl.$^5$ .............................. B23C 3/12; B24B 9/00
[52] U.S. Cl. ................................... 409/80; 51/165.71; 409/84; 409/134; 409/138; 409/140; 364/474.03; 364/474.06
[58] Field of Search .................. 409/80, 79, 84, 92, 409/131, 132, 140, 138, 121, 147; 364/474.06, 474.03; 51/165.71, 165 TP, 5 R, 5 C, 283 E, 284 E

[56] References Cited

U.S. PATENT DOCUMENTS

| | | | |
|---|---|---|---|
| 4,138,926 | 2/1979 | Hoglund | 409/297 |
| 4,280,304 | 7/1981 | Kobayashi | 51/315 |
| 4,373,296 | 2/1983 | Kobayashi | 51/3 |
| 4,396,836 | 8/1983 | Vitaliana et al. | 250/223 R |
| 4,519,167 | 5/1985 | Halberschmidt et al. | 409/92 X |
| 4,528,780 | 7/1985 | Halberschmidt et al. | 51/165.8 X |
| 4,599,020 | 7/1986 | Colburn | 408/211 |
| 4,633,408 | 12/1986 | Reinmold et al. | 364/474 |
| 4,646,479 | 3/1987 | Walker et al. | 51/328 |
| 4,667,443 | 5/1987 | Sakurai et al. | 51/165.71 |
| 4,776,135 | 10/1988 | Thum, III et al. | 51/164.2 |
| 4,835,913 | 6/1989 | Blanton | 51/336 |
| 4,894,597 | 6/1990 | Ohtomi | 318/568.22 |
| 4,993,896 | 2/1991 | Dombrowski et al. | 409/138 |
| 5,018,462 | 5/1991 | Brocklehurst | 112/121.12 |
| 5,040,342 | 8/1991 | McGuire et al. | 51/5 C X |
| 5,146,670 | 9/1992 | Jones | 409/131 X |

FOREIGN PATENT DOCUMENTS 9209404 6/1992 PCT Int'l Appl. ............... 51/283 E
772825 10/1980 U.S.S.R. ........................ 51/283 E

OTHER PUBLICATIONS

Hollowell, et al., "An Analysis of Robotic Champering and Deburring", *American Society of Mechanical Engineers*, pp. 73-79 (1987).
Kazerooni, et al., "Automated Roboting Deburring Using Electronic Compliancy; Impedance Control" *IEEE Conference on Robotics and Automation* (1987).
Whitney, et al., "Metal Removal Models and Process Planning for Robot Grinding" pp. 29-44.
Kazerooni, et al., "An Approach to Automated Deburring by Robot Manipulators" *Transactions of The ASME*, vol. 108 (1986).
Loucks, et al., "CAD Directed Robotic Edge Finishing" *Symposium of Mechanics of Deburring & Surface Finishing Processes*, (1989).
Proctor, et al., "Automating Robot Programming in the Cleaning and Deburring" *Society of Manufacturing Engineers* (1989).
Selleck, et al., "A System for Automated Edge Finishing" *IEEE International Conference on Systems Engineering*, (1990).

*Primary Examiner*—William Briggs
*Attorney, Agent, or Firm*—George H. Libman; Timothy D. Stanley

[57] ABSTRACT

The disclosure is directed to an apparatus and method for automated edge finishing using hybrid position/force control of an XY table. The disclosure is particularly directed to learning the trajectory of the edge of a workpiece by "guarded moves". Machining is done by controllably moving the XY table, with the workpiece mounted thereon, along the learned trajectory with feedback from a force sensor. Other similar workpieces can be mounted, without a fixture on the XY table, located and the learned trajectory adjusted

19 Claims, 6 Drawing Sheets

AUTOMATED EDGE FINISHING USING AN ACTIVE XY TABLE

GOVERNMENT RIGHTS

The U.S. Government has a paid-up license in this invention and the right in limited circumstances to require the patent owner to license others on reasonable terms.

BACKGROUND OF THE INVENTION

1. Field of the Invention (Technical Field)

The invention relates to computer assisted edge finishing of machined parts and more particularly to an apparatus and method for learning the path to be machined without preprogramming the path either manually or with software.

2. Background Art

The one area of manufacturing which has stubbornly resisted efforts toward automation and computer assistance is the edge and surface finishing of machined parts. (B.L. Dawson, Automated surface Finishing, Aerospace Engineering, 9(8) pp.25-28, 1989). Although many parts are created through computer-aided design, then produced on computer numerically-controlled (CNC) machines, when they come off the machining line they still require labor-intensive hand finishing.

The 1970s might be classified as the golden years of deburring and surface finishing because of the wealth of innovations and classification of world-wide efforts. During the 1980s work emphasized robotic deburring and finishing. In the 1990s, environmental concerns will play a greater role in manufacturing, and more automation will be introduced to exclude workers from hazardous materials. This must be true of finishing operations as well. (L. K. Gillespie, *Deburring and Surface Finishing: The Past Ten Years and Projections for the Next Ten Years*, Allied-Signal Aerospace Company, Kansas City Division, KCP-613-4437, Sep. 1990).

Ohtomi (Sadayuki Ohtomi, U.S. Pat. No. 4,894,597, 1990) describes a prior art deburring robot that contains a beam sensor and controller to detect burr positions. The predetermined points to be deburred are manually taught beforehand, either manually or through software, and compared with the data from the sensor and controller, enabling the position taught to be corrected. The grinding tool is mounted on a movable arm which deburrs the mounted workpiece. Ohtomi only describes a deburring device and does not disclose an edge finishing apparatus.

Another prior art deburring device is contained in Dombrowski et al. (David M. Dombrowski et al., U.S. Pat. No. 4,993,896, Feb. 19, 1991). This device uses an industrial manipulator such as an ADEPT ONE to move the deburring tool along the edge of a workpiece. The tool is connected to a pilot which limits horizontal penetration into the edge and exerts pressure to keep the tool in contact with the edge. The device includes a force sensor and linear variable displacement transducer to provide force and position feedback. Like the Ohtomi device, the path for machining must be taught beforehand either manually or by program. Additionally, the machining tool moves around the stationary workpiece.

The quality of the finished edge is directly dependent on the maintenance of a constant contact force. Thus, if control of the tool-workpiece contact force can be improved, quality of the finished edge will improve. This invention provides this control by replacing the force control function of the ADEPT ONE robot with a direct-drive XY table having faster dynamic response. Additionally, this invention improves the speed and efficiency of setup and machining by trajectory learning with guarded moves.

SUMMARY OF THE INVENTION
(DISCLOSURE OF THE INVENTION)

In accordance with the present invention, there is provided a method and apparatus for automated edge finishing using an active XY table. The apparatus comprises a cutting tool affixed to a force sensor. A workpiece is mounted on an XY table. Additionally, the apparatus comprises structure for trajectory learning and structure for an XY table position controller for moving an edge of the workpiece along the learned trajectory. The preferred force sensor comprises a force sensor that detects X, Y and Z forces. The preferred force sensor also comprises a structure for detecting and correcting of the learned trajectory. The preferred XY table controller comprises structure for position control, velocity control, and acceleration control. The preferred trajectory learning apparatus comprises structure for guarded moves. Trajectory learning comprises structure for determining coordinates of different points on an edge of a workpiece to be learned; structure for projecting an edge normal of the workpiece; structure for projecting an edge tangent of the workpiece; structure for smoothing the projections; structure for memory; and structure for output.

The structure for determining coordinates of points on the edge of a workpiece comprises a force sensor. The structure for determining coordinates of points comprises incremental movable contact at a predetermined force between the force sensor and the edge of the workpiece to be learned. The structure for the memory comprises recording X and Y coordinates and edge normal.

The preferred apparatus further comprises a structure for trajectory offset to compensate for material to be removed from the workpiece. The apparatus can further comprise structure for determining an additional workpiece location and structure for adjusting learned trajectory.

The invention additionally comprises a method for automated edge finishing, using an active XY table. The method of the invention comprises the steps of providing a tool; providing a force sensor affixed on the tool; providing an XY table with a workpiece mounted thereon; learning the trajectory of an edge of the workpiece; and controllably positioning the workpiece along the learned trajectory.

The preferred method further comprises the step of detecting a path of the workpiece and correcting the learned trajectory. The preferred method for the step of learning a trajectory of an edge of the workpiece comprises placing the workpiece at a starting point; moving the workpiece towards a tool comprising a force sensor indicating edge contact by the tool via the force sensor; recording a position of a first edge contact in a control computer; withdrawing the workpiece a predetermined distance from the first edge; moving the workpiece tangentially another distance; moving the workpiece toward a second edge of the workpiece; indicating the second edge contact by the tool via the force sensor; recording a position of the second edge contact in the control computer; projecting a line from the first edge contact to the second edge contact; computing an orientation of the projected line as edge tangent; computing edge normal as perpendicular to edge tangent; recording an angle of edge normal in the control computer; withdrawing the workpiece along the edge normal a predetermined distance from the second edge; moving the workpiece tangentially another distance in the direction perpendicular to the edge normal; and repeating the steps for moving the workpiece towards a second edge to the end for additional edge contacts and edge normals until a trajectory is learned.

The preferred method for learning a trajectory further comprises the step of smoothing the learned trajectory. The preferred method of learning a trajectory further comprises offsetting learned trajectory to compensate for material to be removed from the workpiece. The step of moving the workpiece tangentially in the method of learning a trajectory can comprise tangentially moving the workpiece a preselected distance. The step of moving a workpiece tangentially in the method of learning a trajectory can also comprise tangentially moving the workpiece variable distances. The method of the invention can also comprise the steps of determining an additional workpiece location and adjusting the learned trajectory.

One object of the present invention is to provide automated edge finishing to take the place of labor-intensive hand finishing.

Another object of the present invention is for automated trajectory learning of the surface to be machined.

Yet another object of the present invention is to move a workpiece around a stationary tool.

An advantage of the present invention is a detecting feedback loop, whereby a sensor corrects the learned trajectory.

Another advantage of the present invention is the ability to locate another workpiece on the XY table and to adjust the learned trajectory accordingly, without expensive fixtures.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

DESCRIPTION OF THE PREFERRED EMBODIMENTS

(BEST MODES FOR CARRYING OUT THE INVENTION)

The automated edge finishing apparatus and method of the present invention comprises hardware components and associated software, providing the ability to learn a trajectory of a workpiece by "guarded moves," machining the workpiece by moving the workpiece along the trajectory and controlling the trajectory in real time. Similar workpieces can be machined from the learned trajectory without expensive fixtures by the sensors and software locating the tool and adjusting the trajectory. The invention is useful for performing edge finishing on intricately designed workpieces or workpieces with close edge finishing tolerances.

Figure 1:
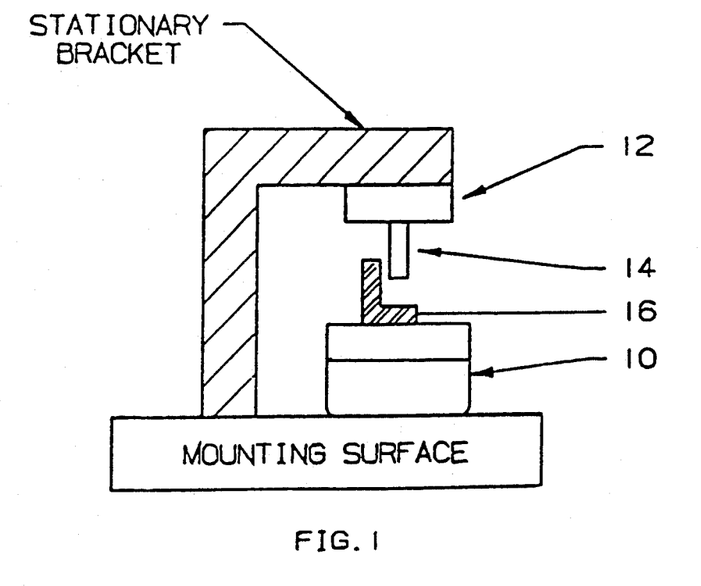
FIG. 1 is a side view of the preferred embodiment of the invention.
Figure 2:
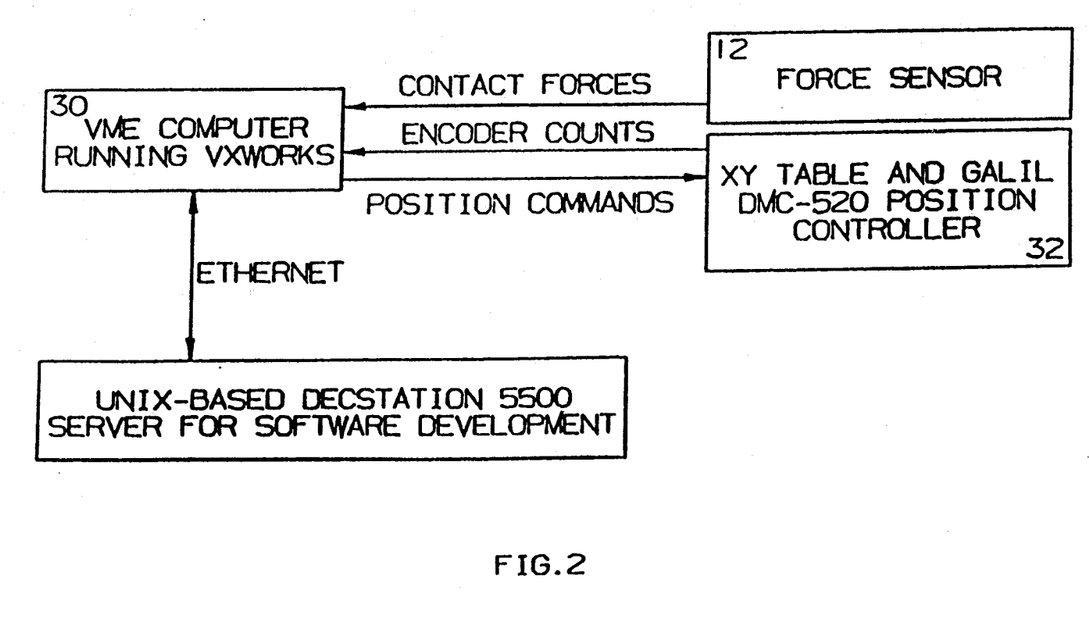
FIG. 2 schematically illustrates the preferred system component interconnections.

The configuration of the preferred system is shown in FIGS. 1 and 2. The preferred invention comprises an XY table 10, a force sensor 12, cutting tool 14, XY table position control hardware 32, and a control system as shown in FIG. 2. The preferred XY table 10 comprises a Daedal Series 200000, or the like, powered by TLM120 linear motors from Trilogy Systems Corporation, or the like. The linear actuators comprise three-phase brushless linear motors, with a stationary magnet track and a moving coil assembly. The linear motors are driven by DC amplifiers, such as PWM amplifiers. Both table axes are equipped with incremental encoders with a resolution of 12,700 counts/inch.

The innermost level of table control is position control, by a controller 32 such as a DMC-520 motion controller from Galil Motion Control, as shown in FIG. 2. This board controls position of both table axes using proportional plus derivative (PD) control action. The resulting position-controlled table is the starting point for the force control system discussed below.

A force sensor 12 such as from JR$^3$ is used to sense the tool-workpiece contact force. This sensor measures all six components of force/torque, although only X, Y, and Z forces are necessary for edge finishing with this system. The maximum force without saturation is 20 pounds, with a resolution of 0.5 oz.

The control VME computer 30 for the edge finishing system can built around a Motorola 68020 processor, or the like, and a VME bus, or the like. The backplane of the system also contains serial and parallel interfaces for external communication. A VxWorks real-time operating system or similar system can be used, allowing software development in the C language on a remote host computer. The VME computer 30 communicates with the table controller 32, force sensor 12, and with a remote host (for example a sun-4) for software development. A schematic diagram of the system components and their interconnection is shown in FIG. 2.

The development of a hybrid force/position controller for the XY table 10 allows the table to move the workpiece 16 past the deburring tool 14 and also to control the contact force. With hybrid position/force control, there are directions along which position must be controlled, and orthogonal directions along which force must be controlled. For the XY table edge finishing system, position must be controlled in the edge-tangential direction, while force must be controlled in the edge-normal direction.

Figure 3:
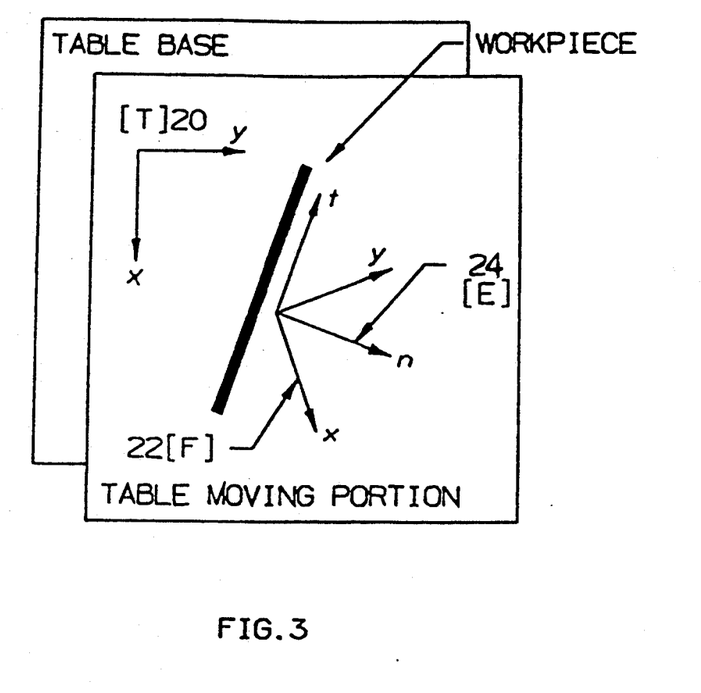
FIG. 3 is a top view of an XY table illustrating coordinate frames of the table, sensor, and workpiece.

FIG. 3 illustrates the three coordinate frames of interest: the table frame 20, the force sensor frame 22, and the workpiece edge frame 24. The tangential position controller uses a position tracking error formed in the edge frame 24 edge tangential direction to actuate the table, while the normal force controller uses a force error formed in the edge frame 24 edge normal direction to actuate the table. Both table commands are summed.

Referring to FIG. 3, note that the relationship of edge frame 24 and fixed frames 20 and 22 will change with time, and the relationship between these frames must be updated on line.

Figure 4:
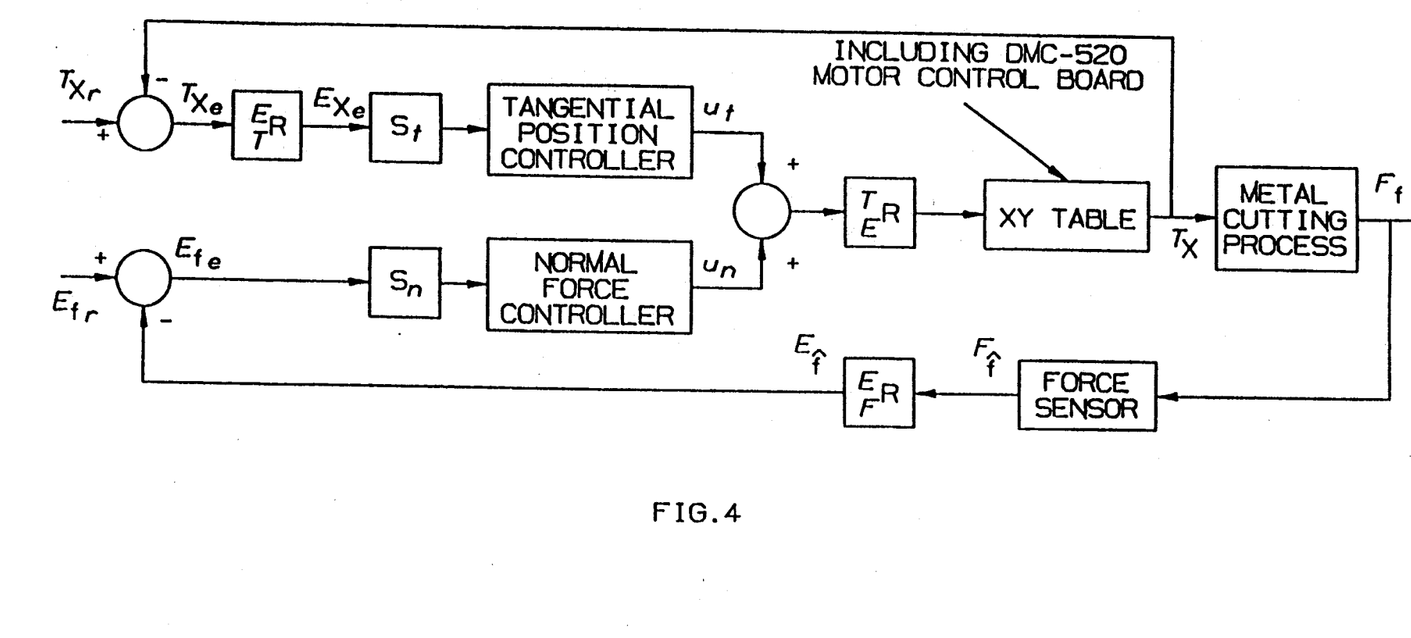
FIG. 4 is a block diagram of the preferred position/force control system.

FIG. 4 shows a block diagram of the hybrid position/force control system. The R matrices convert between the three coordinate frames, while the diagonal selection matrices S select either the normal or tangential vector component.

The variables in FIG. 4 are as follows:
$T_{xr}$: desired table position in trajectory {T}
$T_{xe}$: table position tracking error in {T}
$T_{xe}$: position tracking error in {E}
$T_x$: actual table position in {T}
$E_{fr}$: desired contact force in {E}
$E_{fe}$: contact force error in {E}
$F_f$: contact force in {F}
$F_f$: measured contact force in {F}
$E_f$: measured contact force in {E}
$u_r$: contact force in edge frame
$u_r$: contact force in edge frame The block marked "XY table" in FIG. 4 also includes the Galil DMC-520, or the like, motor controller dynamics. These dynamics consist of a pure integration and a single real zero. The dynamics of the table plus the motor controller board are modeled as a unit for tangential position controller design. The block marked "metal cutting process" in FIG. 4 represents the dynamics of the deburring tool as it removes material from an edge. The dynamics of the "XY table" (table and motor controller) plus the "metal cutting process" are also be identified as a unit for normal force controller design.

To design the tangential position and normal force controllers shown in FIG. 4, analytical models of both the XY table, and the XY table+metal cutting process is shown. The sample rate for the identification presented below is 125 Hz for a sample period of 8 msec.

The first analytical model is for the XY table. The plant is the table plus DMC-520 motor control board. Driving the plant with a random sequence of amplitude 0.013 mm produced data which yielded the following transfer function:

$$G(z) = \frac{X(z)}{X_r(z)} = \quad (1)$$

$$\frac{0.0284z^{-2} + 1.1346z^{-3} + 0.9128z^{-4}}{1 - 0.2089z^{-1} - 0.5426z^{-2} - 0.2158z^{-3} - 0.0326z^{-4}} \quad \frac{\text{count}}{\text{count}}$$

which has two delays, poles at 1.0, $-0.22 \pm j0.21$, $-0.34$, and zeros at $-0.82$ and $-39$. The integration in the DMC motor control board is reflected in the pole at 1.

The second analytical model is for the XY table+metal cutting process. The plant here is the XY table with the metal cutting process added, and the deburring tool in contact with the workpiece. The input, as before, is commanded position. The output is measured normal force. The measured normal force is filtered by a 34 Hz four-pole anti-aliasing analog filter before digitization.

A feed rate of 2 ipm is used in this procedure. Three PRBs input sequences, of magnitude 0.10, 0.15, and 0.20 mm produced the ARMA coefficients shown in Table 1.

TABLE 1

| input magnitude | $a_1$ | $a_2$ | $a_3$ | $b_7$ | $b_8$ | $b_9$ |
|---|---|---|---|---|---|---|
| 0.10 mm | −0.5892 | −0.2544 | −0.1228 | 3.0464 | 6.2846 | 2.6475 |
| 0.15 mm | −0.7654 | −0.0363 | −0.1632 | 3.2241 | 6.4190 | 2.4456 |
| 0.20 mm | −0.9181 | 0.1652 | −0.2154 | 3.1381 | 5.9790 | 1.8727 |

These models have six delays. The delays come from reduced-order modeling of the overall dynamics, which consist of table dynamics, cutting process dynamics, and the anti-aliasing filter. The coefficients in Table 1 vary monotonically with the input magnitude. The 0.15 mm coefficients are representative, and the corresponding transfer function is:

$$G(z) = \frac{F(z)}{X_r(z)} = \quad (2)$$

$$\frac{3.2241z^{-7} + 6.4190z^{-8} + 2.4456z^{-9}}{1 - 0.7654z^{-1} - 0.0363z^{-2} - 0.1632z^{-3}} \quad \frac{\text{mlb}}{\text{count}}$$

This model has poles at 0.97, $-0.10 \pm j0.40$ and zeros at $-0.51$, $-1.48$. Note that the pure integration is no longer present. This is due to the metal removal, which erodes the surface against which the reaction force is generated.

As shown in FIG. 4, the tangential controller receives the tangential component of position trajectory tracking error and generates the tangential-direction table command. The plant transfer function for this controller is that of equation (1). For edge finishing, the reference position trajectory will nominally be a ramp with constant velocity (feed rate). A Type II position controller, with its zero steady-state position error in velocity-following, is therefore desirable. The proportional-plus-integral-plus derivative controller yielding satisfactory dynamic response is that given by:

$$D(z) = \frac{0.1975 - 0.1876z^{-1}}{1 - z^{-1}} \quad (3)$$

The dynamics to be controlled here are the table +metal cutting process, with model given by equation (2). Using this plant transfer function, a proportional-plus-derivative force controller is:

$$D(z) = 0.036 - 0.022z^{-1} \quad (4)$$

The dominant natural response mode using this force controller has a natural frequency of over 6 Hz.

The force sensor 12 of FIG. 1 allows the table to perform "guarded moves," which are moves in a direction that terminate upon receipt of a preset threshold force. With this capability, the cutting tool 14 can repeatedly contact the part 16, storing its location at contact. The locus of these stored points defines the part outline or reference trajectory in the table frame 20, inherently including cutter radius compensation. The table 10 must be positioned near the start of the trajectory, and must know the edge orientation at the start. It can then perform successive guarded moves at a preset step size to "learn" the part. Stepping from one point to the next along the edge tangent is done using the last-computed edge orientation. In an alternate embodiment, the step s size can be varied during the "guarded moves" procedure by sensing the contour of the workpiece. The step size will increase for straight or uniform angled edges and decrease for steep angles or intricate patterns. This can be accomplished by the force sensor 12, XY table 10, XY table position controller 32, and control computer.

The data stored at each guarded move consists of 3-tuples [x y $\theta$], where x and y define the planar reference trajectory, and $\theta$ defines the outward-pointing edge normal. Angle $\theta$ is used to update the R transformations in FIG. 4.

When a reference trajectory is learned, there is some noise in the resulting data, partly due to the random interaction of the sampling frequency and instant of edge contact, and partly due to rotation of the fluted deburring tool, which is free to rotate in the spindle. The same point will yield a slightly different position if the contact is between flutes or at the peak of a flute.

The angle $\theta$ is used to update the R transformation matrices in FIG. 4. Error in $\theta$ results in imperfect transformation from the edge frame 24 space, where the force error is formed, and the table frame 20 space, where the position error is formed and the table is commanded.

Real-time filtering always introduces phase shift, which would cause the angle points to be out of registration with the corresponding [x y] points. However, since the entire trajectory is known before run time, off line filtering is possible. A well-known technique to avoid phase shift is to filter a sequence twice, the second time using time-reversal.

The cutoff frequency of this angle filter must be high enough to avoid reshaping the angle function, yet low enough to avoid aliasing. The effective sampling frequency of the trajectory learning process is dependent both on learned point spacing and the feed rate which will be used at run time. The frequency content of the learned angle function is dependent on the curvature of the workpiece and the feed rate.

EXAMPLES (INDUSTRIAL APPLICABILITY)

The invention is further illustrated by the following non-limiting examples.

EXAMPLE I

Figure 5:
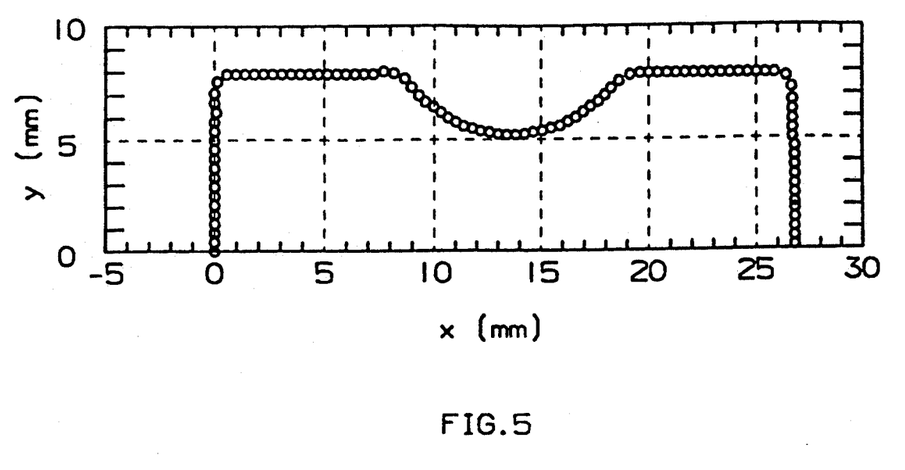
FIG. 5 is a graph of the learned trajectory of the workpiece of Example I.

An experimental model of the invention of FIG. 1 was constructed. One end of a test stainless steel coupon had two sharp corners and a circular notch. The learned trajectory of this part is shown in FIG. 5. The learned point spacing was 0.4 mm, while the feed rate v was to be 10 ipm (4.23 mm/sec). The smallest radius of curvature r in the trajectory of FIG. 6 was about 1 mm. Thus, the highest frequency was:

$$\omega = \frac{v}{r} = \frac{4.23 \text{ mm/sec}}{1 \text{ mm}} = 4.23 \text{ rad/sec} \Rightarrow f = 0.067 \text{ Hz} \quad (5)$$

Figure 6:
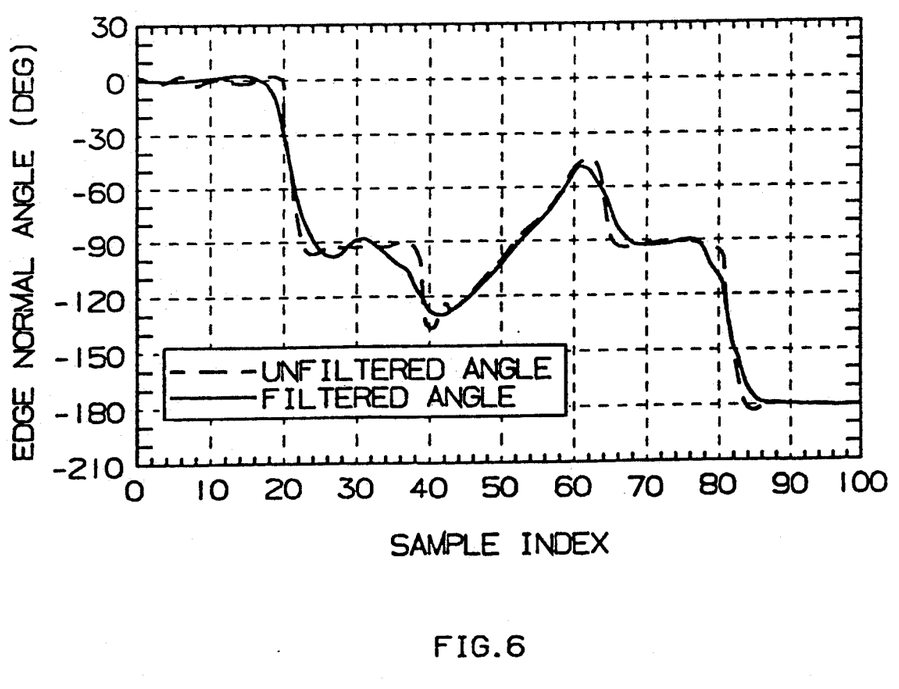
FIG. 6 is a graph of the filtered versus unfiltered angle as measured in Example I.

Based on the peak frequency content of 0.67 Hz, a three pole filter with a 1.0 Hz cutoff frequency was selected. Given the 0.4 mm point spacing, the effective sampling period was:

$$T = \frac{d}{v} = \frac{0.04 \text{ mm/sample}}{4.23 \text{ mm/sec}} = 0.095 \text{ samples/sec} \quad (6)$$

which is used to obtain the filter coefficients. The unfiltered and filtered angle are shown in FIG. 6. Note the zero phase shift due to time reversal. This angle filtering eliminated the coupling problems.

EXAMPLE II

This section presents the procedure and results of using the XY table system of FIG. 1 to perform edge finishing on a jet engine turbine hub. The hub was circular, 9.470 inches in diameter, with 86 "christmas tree" shaped slots in the periphery, which receive the turbine blades. During manufacturing, these slots were broached, then a "pre-break" operation was performed to chamfer the edges before further smoothing/stress-relief processing. This pre-break operation required a chamfer of 0.020±0.010 inches on the edges of the slots.

Figure 7:
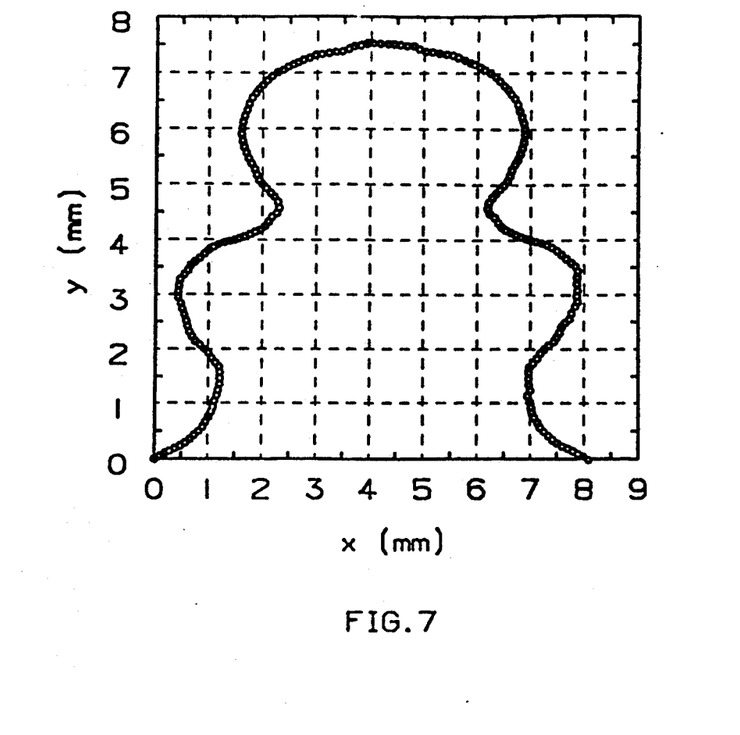
FIG. 7 is a graph of the learned trajectory of the workpiece of Example II.

The trajectory of the "christmas tree" was obtained automatically, using the table to "learn" it via guarded moves. FIG. 7 shows the trajectory. Note that this is the path the tool center must take, thus incorporating cutter radius compensation. Note also that this is a rather intricate contour, with small radii of curvature. In learning the trajectory, position data were taken at a spacing of 0.0039 inches, as shown by the number of data points in FIG. 7.

Figure 8:
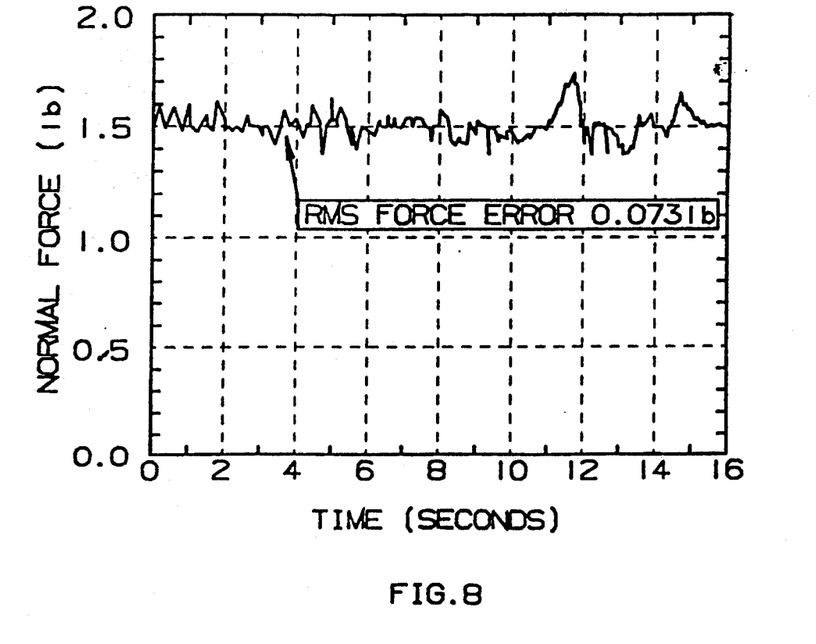
FIG. 8 is a graph of the normal contact force during machining of Example II.

The turbine hub was made of high-temperature steel alloy, and therefore a carbide deburring cutter was used. A feed rate of 3 ipm and a reference contact force of 1.5 lbs gave acceptable material removal. The normal contact force during the operation is shown in FIG. 8. The completion time for one "christmas tree" was 16 seconds, for a total hub finishing time (both sides) of approximately 45 minutes. This is an order of magnitude decrease in processing time compared to the current manual operation. The resulting part met the manufacturer's requirements.

The preceding examples can be repeated with similar success by substituting the generically or specifically described reactants and/or operating conditions of this invention for those used in the preceding examples.

Although the invention has been described with reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, and of the corresponding application are hereby incorporated by reference.

What is claimed is:

1. An apparatus for automated edge finishing and deburring of a workpiece comprising:

tool means operable at a fixed station;

XY table means with a workpiece mounting means trajectory learning means;

XY table position controller means for moving an edge of the workpiece along said learned trajectory; and force sensor means affixed on said tool means and operatively connected to said controller means.

2. The invention of claim 1 wherein said force sensor means comprises a force sensor that detects X, Y and Z forces.

3. The invention of claim 1 wherein said force sensor means further comprises detection means for correction of said learned trajectory.

4. The invention of claim 1 wherein said XY table position controller means comprises:

position control means;

velocity control means; and acceleration control means.

5. The invention of claim 1 wherein said trajectory learning means comprises guarded moves means.

6. The invention of claim 1 wherein said trajectory learning means comprises:

means for determining coordinates of different points on an edge of a workpiece to be learned;

means for projecting an edge normal of the workpiece;

means for projecting an edge tangent of the workpiece;

means for smoothing said projections;

memory means; and output means.

7. The invention of claim 6 wherein said means for determining coordinates of points on an edge of a workpiece comprises using force sensor means.

8. The invention of claim 7 wherein using said force sensor means for determining coordinates of points comprises incremental moveable contact at a predetermined force between said force sensor means and the edge of the workpiece to be learned.

9. The invention of claim 6 wherein said memory means comprises recording X and Y coordinates and edge normal.

10. The invention of claim 6 further comprising means for trajectory offset to compensate for material to be removed from the workpiece.

11. The invention of claim 1 further comprising:

means for determining an additional workpiece location; and means for adjusting said learned trajectory.

12. A method of automated edge finishing and deburring of a workpiece comprising the steps of:

a) providing a tool means at a fixed station;

b) providing an XY table with a workpiece mounted thereon;

c) providing means for learning a trajectory of an edge of the workpiece;

d) providing means for controllably positioning the workpiece along the learned trajectory; and e) providing a force sensor affixed on the tool and operatively connected to said controller means.

13. The method of claim 12 further comprising the step of detecting a path of the workpiece and correcting the learned trajectory.

14. The method of claim 12 wherein the step of learning a trajectory comprises:

a) placing a workpiece at a starting point;

b) moving the workpiece towards a tool comprising a force sensor;

c) indicating edge contact by the tool via the force sensor;

d) recording a position of a first edge contact in a control computer;

e) withdrawing the workpiece a predetermined distance from the first edge;

f) moving the workpiece tangentially another distance;

g) moving the workpiece toward a second edge of the workpiece;

h) indicating the second edge contact by the tool via the force sensor;

i) recording a position of the second edge contact in the control computer;

j) projecting a line from the first edge contact to the second edge contact;

k) computing an orientation of the projected line as edge tangent;

l) computing edge normal as perpendicular to edge tangent;

m) recording an angle of edge normal in the control computer;

n) withdrawing the workpiece along the edge normal the predetermined distance from the second edge;

o) moving the workpiece tangentially another distance in the direction perpendicular to the edge normal; and p) repeating steps g through o for additional edge contacts and edge normals until a trajectory is learned.

15. The method of claim 14 further comprising the step of smoothing said learned trajectory.

16. The method of claim 14 further comprising the step of offsetting the learned trajectory to compensate for material to be removed from the workpiece.

17. The method of claim 14 wherein the step of moving the workpiece tangentially comprises tangentially moving the workpiece a preselected distance.

18. The method of claim 14 wherein the step of moving the workpiece tangentially comprises tangentially moving the workpiece variable distances.

19. The method of claim 13 further comprising the steps of:

a) determining an additional workpiece location; and b) adjusting the learned trajectory.

* * * * *